United States Patent [19]

Sauer

[11] 4,247,954

[45] Jan. 27, 1981

[54] ACTIVE WINDOW ANTENNA FOR MOTOR VEHICLES

[75] Inventor: Gerd Sauer, Aachen-Laurensberg, Fed. Rep. of Germany

[73] Assignee: Saint-Gobain Industries, Aubervilliers, France

[21] Appl. No.: 15,860

[22] Filed: Feb. 27, 1979

Related U.S. Application Data

[63] Continuation-in-part of Ser. No. 829,779, Sep. 1, 1977, Pat. No. 4,163,195.

[30] Foreign Application Priority Data

Mar. 1, 1978 [DE] Fed. Rep. of Germany ....... 2808745

[51] Int. Cl.$^3$ .............................................. H04B 1/18

[52] U.S. Cl. .................................... 455/243; 330/277; 330/281; 343/713; 455/290; 455/291; 455/294

[58] Field of Search ............................... 343/711-713; 325/312, 313, 319, 373, 374, 375, 377, 379, 383, 410-414; 330/277-281; 455/239, 242-244, 253, 344, 345, 269, 280, 281, 286, 290, 291, 293, 294, 297

[56] References Cited

U.S. PATENT DOCUMENTS

| | | | |
|---|---|---|---|
| 3,351,861 | 11/1967 | Martin et al. | 325/414 |
| 3,388,338 | 6/1968 | Austin | 330/277 |
| 3,404,347 | 10/1968 | Kaplan et al. | 330/277 |
| 3,557,309 | 1/1971 | Graham | 325/411 |
| 3,566,276 | 2/1971 | Finkel | 325/414 |
| 3,570,005 | 3/1971 | Prolss | 325/319 |
| 3,582,791 | 6/1971 | Slavin et al. | 325/373 |
| 3,693,096 | 9/1972 | Dosey et al. | 325/383 |
| 3,771,159 | 11/1973 | Kawaguchi et al. | 343/713 |
| 4,057,765 | 11/1977 | Schuermann | 330/279 |
| 4,077,014 | 2/1978 | Satoh | 330/277 |

FOREIGN PATENT DOCUMENTS

| | | | |
|---|---|---|---|
| 2336320 | 6/1975 | Fed. Rep. of Germany | 343/313 |
| 2730592 | 12/1978 | Fed. Rep. of Germany | 325/373 |

*Primary Examiner*—Marc E. Bookbinder
*Attorney, Agent, or Firm*—Pennie & Edmonds

[57] ABSTRACT

To minimize overmodulation in an active window antenna and radio receiver system, an amplification control voltage is produced in the active antenna, i.e., directly behind the antenna pre-amplifier, and is used to control the amplification of the pre-amplifier.

3 Claims, 3 Drawing Figures

ACTIVE WINDOW ANTENNA FOR MOTOR VEHICLES

CROSS REFERENCE TO OTHER APPLICATIONS

This is a continuation-in-part of my U.S. application Ser. No. 829,779, filed Sept. 1, 1977 now U.S. Pat. No. 4,163,195.

BACKGROUND OF THE INVENTION

The invention concerns an active window antenna for motor vehicles having an antenna conductor arranged in or on a windshield and a pre-amplifier circuit with a high-ohmic transistor input in the AM transmission band.

Motor vehicle window antennas and/or radio receivers are described in U.S. Pat. Nos. 3,576,576; 3,587,017; 3,623,108; 3,693,096; 3,771,159; 3,810,184; 3,939,423; 3,965,426; and 3,971,030 and my co-pending U.S. application Ser. No. 829,779, now U.S. Pat. No. 4,163,195 all of which are incorporated herein by reference. As shown, for example, in FIG. 11 of the U.S. Pat. No. 3,771,159 the typical antenna-receiver system of the prior art comprises an antenna mounted in or on the window of a motor vehicle, a preamplifier which is located on or near the window, a feeder such as a coaxial cable, and a radiao receiver. The combination of a window antenna and a pre-amplifier located on or near the window will be referred to as an active antenna.

When transmitter field intensities are too high, the wideband amplifier in the radio receiver can be overmodulated. The critical case of overmodulation appears when a weak transmitter is being received in the vicinity of a strong transmitter. The most unfavorable situation involves a VHF station in the case of the transmitter being received and a long-wave station in the case of the interfering transmitter. In this case, even if amplification control were provided within the radio receiver, it would have no effect because the interfering transmitter lies on a frequency outside the range of the bandwidth of the receiver.

In the case of active rod antennas, overmodulation of the wideband amplifier of the radio receiver may be prevented by bending the antenna rod or, in the case of a telescopic antenna rod, by shortening it.

While overmodulation may be compensated by this means in an active rod antenna, this is not possible in the case of an active window antenna since the position and the length of the antenna conductor are fixed. An object of the present invention is to provide overmodulation of the receiver in an active window antenna.

SUMMARY OF THE INVENTION

This object is accomplished by a control circuit which controls the amplification of the antenna pre-amplifier inversely as a function of the output voltage of the pre-amplifier.

In conventional antenna and radio receiver systems, the amplification control voltage is produced near the last stage of amplification, namely in the vicinity of the demodulator of the radio receiver, and is used for control of the intermediate-frequency amplifier and, in more demanding instruments, for control of the radio receiver pre-amplifier.

In my invention, to minimize overmodulation, the amplification control voltage is produced in the active antenna, i.e., directly behind the antenna pre-amplifier, and is used to control the amplification of the pre-amplifier. In this way overmodulation may be prevented even in cases in which the amplification controls known in radio receivers fail to lead to a satisfactory result.

In one preferred embodiment of the invention, the pre-amplifier comprises a double-gate field-effect transistor, the amplification of which is controllable by way of a control voltage applied at one gate. The control voltage is generated by a feedback circuit connected between the output of the pre-amplifier and the control gate. The feedback control circuit preferably comprises a junction field-effect transistor which decouples the pre-amplifier output and the control gate.

In an advantageous further development of the invention, the feedback control circuit comprises a storage device comprising an RC unit having a discharge time constant of at least 1 second. This helps prevent flutter, which may appear, for example, in a strong VHF field.

In a further development of the invention, a rectified control voltage is applied across a Zener diode to the $G_2$ gate of the double-gate MOS field-effect transistor. As a result, amplification is controlled only when the pre-amplifier output exceeds a predetermined value.

Finally, performance of the window antenna is further improved by a pre-amplifier circuit having a final stage with low-ohmic output resistance.

BRIEF DESCRIPTION OF THE DRAWING

These and other objects, features and elements of my invention will be more readily apparent from the accompanying drawing in which.

DETAILED DESCRIPTION OF THE INVENTION

Figure 1:
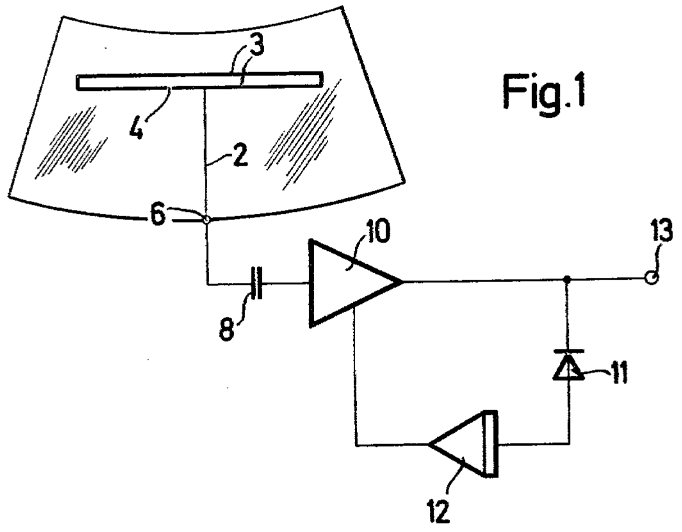
FIG. 1 is a schematic illustration of a generalized embodiment of an active antenna.

As shown in FIG. 1, an active antenna of my invention comprises an antenna conductor and a pre-amplifier. The antenna conductor is arranged on the surface of a windshield 1 or in an intermediate plastic layer thereof, the length and arrangement of this conductor being fixed. The antenna conductor comprises a conductor segment 2 arranged vertically in the center of the windshield and a conductor segment 3 arranged horizontally in the form of a loop along the upper edge of the windshield. The loop-like conductor 3 is provided with a break 4 in its lower portion. The directional effect of the antenna may be corrected within certain limits by selection of the position in which the break 4 is provided as described in my co-pending U.S. application Ser. No. 829,779, now U.S. Pat. No. 4,163,195. At the lower end of the central conductor segment 2, at the base of the antenna, is a connecting element 6 for connection with the pre-amplifier.

The antenna voltage tapped at the connecting element 6 is connected by way of a condenser 8 to a pre-amplifier 10. Amplifier 10 is a wideband high-frequency amplifier, the amplification of which is adjustable by an auxiliary voltage. A portion of the amplified antenna voltage is taken from the output of the pre-amplifier and delivered by a rectifier 11 to a direct-current voltage amplifier 12. The signal at the output of rectifier 11 is a measure of the amplitude of the signal within the bandwidth of the active antenna. The direct-current voltage from the direct-current voltage amplifier 12 is applied to the high-frequency pre-amplifier 10 to control the degree of amplification. As a result, the antenna voltage at output 13 of the active antenna will not produce distortions in the radio receiver even in the presence of a strong interference field.

Figure 2:
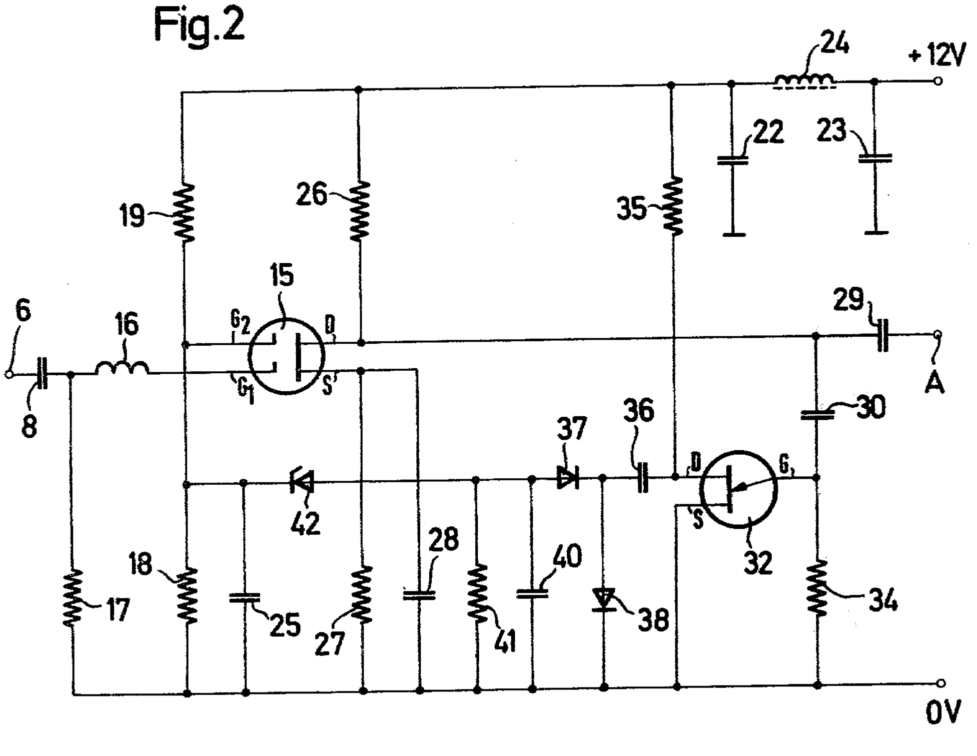
FIG. 2 is a detailed schematic illustration of a first embodiment of my invention.

FIG. 2 shows a circuit diagram of a first illustive embodiment of an amplifier designed pursuant to the invention. Signal amplification is produced by transistor 15, which is a double-gate MOS field-effect transistor such as a Texas Instruments BF 900. As will be recognized, the BF 900 MOSFET is a high input impedance amplifier, having a resistive component of approximately 300 KOhm in the AM transmission band (and approximately 300 Ohms at about 700 megacycles). Antenna conductor 2, 3 and transistor 15 are tuned to each other by a condenser 8 with a capacitance of 18 pF and an air coil 16 consisting of 25 windings with an inside coil diameter of 3 mm. A resistance 17, with a value of 470 KOhm, biases the voltage of gate $G_1$ at zero potential. Resistances 18 (470 KOhm) and 19 (1 MOhm) produce a voltage potential of approximately 5 volts at gate $G_2$ which biases transistor 15 at the state of rest. Condenser 25, with a capacitance of 10 nF, short-circuits resistor 18, in respect to alternating voltage. A resistance 26, with a value of 470 Ohm, provides a load resistance for transistor 15. The RC combination of resistance 27 and condenser 28 stabilizes the static working point of the transistor 15. Resistance 27, with a value of 150 Ohm, thereby produces a source voltage causing reverse feedback as a function of source current; and condenser 28, with a capacitance of 10 nF, prevents reverse feedback from taking effect in respect to alternating voltage.

The amplified antenna voltage at the drain D of the transistor 15 is carried by a coupling condenser 29 to the output A and from there is carried by a shielded conductor to a radio receiver.

A filter unit, comprising a condenser 22 with a capacitance of 10 nF, a condenser 23 with a capacitance of 0.33 $\mu$F, and a coil 24 with an inductance of 25 $\mu$H is connected in the 12-volt power-supply line to eliminate voltage transients.

To control the gain of transistor 15, the output voltage of the transistor is applied through a condenser 30 of 1 nF to gate G of a transistor 32. Transistor 32 is a junction field-effect transistor, for example of the BF 245 type, which decouples the output voltage signal from the following rectification stage. Direct rectification of the output signal would result in undesirable harmonics formation. A resistance 34, with a value of 1 MOhm, biases gate G of transistor 32 at zero potential and thus determines its working point. A resistance 35, with a value of 1 KOhm, serves as the load resistance of the transistor 32.

The signal voltage from transistor 32 is applied by a condenser 36, with a capacitance of 1 nF, to a rectifier comprising two diodes 37 and 38. Diodes 37 and 38 function as a voltage-doubler circuit. The signal from the voltage doubler circuit is integrated by a charging condenser 40, which has a capacitance of 1 $\mu$F, to form a direct-current voltage which is proportional to the amplifier output voltage. Resistance 41 forms the discharge resistance for the charging condenser 40. A value of 1 MOhm for the resistance 41 results in a discharge time constant of 1 second. If desired, circuits with longer time constants may be used.

A Zener diode 42, which has a Zener voltage of about 6 volts, is connected between gate $G_2$ of transistor 15 and charging condenser 40. As a result, the Zener diode is conductive in the breakdown region only when the voltage on condenser 40 is negative and has a magnitude of at least one volt. Greater condenser voltages linearly reduce the voltage at gate $G_2$ and thereby reduce the amplification of the transistor 15. Thus, amplification is controlled only with the pre-amplifier output exceeds a predetermined value.

Figure 3:
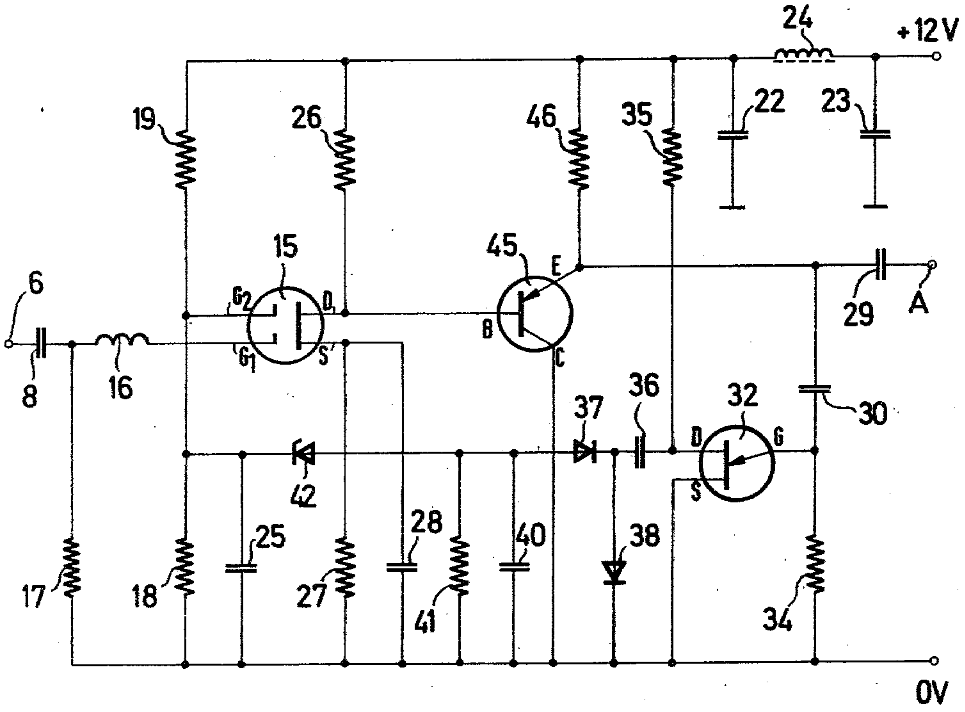
FIG. 3 is a detailed schematic illustration of a second embodiment of my invention.

The antenna amplifier shown in FIG. 3 differs from the example represented in FIG. 2 in that it has an end stage with low output resistance. This reduces the damping of the input circuit of the radio receiver in comparison with an amplifier having a higher output resistance such as that shown in FIG. 2. As a result, the selectivity and sensitivity of a radio receiver connected to the active antenna of FIG. 3 is greater.

Most of the elements of FIG. 3 are the same as those of FIG. 2 and are designated by the same numbers. However, the final stage of the pre-amplifier of FIG. 3 comprises a transistor 45, of pnp type, in a common collector circuit. A BF 450 transistor is suitable for this application. The base B is directly connected to the drain D of the transistor 15, while the collector C lies at zero potential. The working point of the transistor 45 is established by the drain voltage of the transistor 15. The emitter E of the transistor 45 is connected by a load resistance 46, with a value of 100 Ohm, to the operating voltage of +12 volts. Decoupling is effected by a condenser 29. With this final stage the antenna amplifier has an output resistance of less than 100 ohm.

As will be apparent, numerous modifications may be made to my invention without departing from the spirit and scope thereof.

I claim:

1. An active window antenna for motor vehicles comprising an antenna conductor arranged in or on a windshield and a pre-amplifier circuit located nearby, said antenna and pre-amplifier circuit comprising:

- a double-gate MOS field-effect transistor, said antenna conductor being connected to a first gate of said transistor and amplification of said transistor being controlled by a control voltage applied to a second gate of said transistor, said transistor providing a high input resistance in the AM range and a comparatively low input resistance in the FM range; and
- a control circuit which controls the amplification of said pre-amplifier circuit as a function of the output voltage of said pre-amplifier circuit, said control circuit comprising:
  - a junction field-effect transistor, coupled to an output of said double-gate transistor,
  - a storage device having a discharge time constant of approximately one second or more, said storage device being coupled to said junction field-effect transistor to form a DC voltage which is proportional to the output voltage of said pre-amplifier circuit, and
  - a Zener diode coupled between said second gate and said storage device such that the voltage at said second gate is controlled by that stored by said storage device only when said Zener diode operates in the breakdown region.

2. An active window antenna according to claim 1 characterized in that the pre-amplifier circuit has a final stage with low-ohmic output resistance.

3. An active window antenna according to claim 2 characterized in that the final stage has a transistor connected in a common collector circuit arrangement.

* * * * *

UNITED STATES PATENT AND TRADEMARK OFFICE

CERTIFICATE OF CORRECTION

PATENT NO. : 4,247,954

DATED : January 27, 1981

INVENTOR(S) : Gerd Sauer

It is certified that error appears in the above-identified patent and that said Letters Patent are hereby corrected as shown below:

Column 1, line 28, after "a" and before "receiver" delete "radiao" and substitute therefor--radio--;

Column 1, line 51, after "to" and before "overmodulation" delete "provide" and substitute therefor --prevent--.

Column 2, line 55, after "position" and before "which" delete "in" and substitute therefor --at--.

Column 3, line 16, after "about" and before "megacycles" delete "700" and substitute therefor --100--.

Column 4, line 7, after "only" and before "the" delete "with" and substitute therefor --when--;

Column 4, line 29, after "100" and before the period delete "ohm" and substitute therefor --Ohm--.

Signed and Sealed this

*Fifth* Day of *May 1981*

[SEAL]

*Attest:*

RENE D. TEGTMEYER

*Attesting Officer* *Acting Commissioner of Patents and Trademarks*